United States Patent [19]
Fox et al.

[11] 3,947,924
[45] Apr. 6, 1976

[54] CHUCK KEY STORAGE APPARATUS

[76] Inventors: James C. Fox, 1930 Aurelius Road, Mason, Mich. 48854; Chester J. Bilich, 36906 Briarcliff, Sterling Heights, Mich. 48077

[22] Filed: June 10, 1974

[21] Appl. No.: 477,690

[52] U.S. Cl.............. 24/3 A; 279/1 K; 408/241 R
[51] Int. Cl.² .............. B23B 39/00; A44B 21/00
[58] Field of Search... 24/3 A, 16 R, DIG. 1, 274 R; 279/1 K, 58; 408/241 R, 234

[56] References Cited
UNITED STATES PATENTS

| | | | |
|---|---|---|---|
| 1,213,102 | 1/1917 | Hill | 24/3 A |
| 1,701,057 | 2/1929 | Thatcher | 24/3 A |
| 2,396,922 | 3/1946 | Magnenat | 279/1 K UX |
| 2,713,407 | 7/1955 | Miller | 279/1 K UX |
| 2,776,848 | 1/1957 | Stupell | 24/DIG. 1 UX |
| 2,880,008 | 3/1959 | Stoner | 279/1 K UX |
| 3,174,365 | 3/1965 | Lucarelli | 279/1 K UX |
| 3,311,959 | 4/1967 | Schaub | 24/274 R |
| 3,728,038 | 4/1973 | Gage | 408/241 |

FOREIGN PATENTS OR APPLICATIONS

| | | | |
|---|---|---|---|
| 302,230 | 10/1965 | Netherlands | 408/241 |

*Primary Examiner*—Donald A. Griffin
*Attorney, Agent, or Firm*—Jon C. Winger

[57] ABSTRACT

A chuck key storage apparatus for use with a drilling machine for conveniently storing a chuck key. The apparatus, and thus the chuck key, is movable between a stored position and a functional position. In the stored position, the chuck key is positioned remote from a chuck of the drilling machine, and in the functional position the chuck key is located to engage the chuck.

1 Claim, 5 Drawing Figures

CHUCK KEY STORAGE APPARATUS

BACKGROUND OF THE INVENTION

1. Field of the invention

The present invention pertains to retractor mechanisms and more particularly to retractor mechanisms for the storage of drilling machine chuck keys.

2. Discussion of the Prior Art

To the best of our knowledge, we are unaware of an apparatus adapted to be attached to a drilling machine and used for the storage of a chuck key.

Drilling machine chuck keys, while considered to be an inexpensive individual item, can be relatively expensive for a commercial business which uses a large number of drilling machines and, thus, chuck keys. Chuck keys, being loose items, are easily lost. Lost chuck keys must be quickly replaced, for without the chuck key the drilling machine is useless. The seriousness of a lost chuck key for a particular drilling machine is compounded by reason that drilling machine chucks are not of a universal or standard design. Therefore, the chuck key for a given drilling machine will not necessarily fit the chuck of a drilling machine of a different manufacturer. In addition to the purchase price of a key, machine down-time and lost man-hours must be included in the cost.

Even if the operator of a drilling machine is particularly careful with a chuck key, he must spend time to place it in, and retrieve it from a safe place. The safe place is usually in his tool box which is more than likely inconveniently located relative to the work station. This situation is particularly true in the case of portable or hand held drilling machines which are carried from work station to work station around a job site.

Even for a householder, searching for a loose chuck key can be very irritating, and a lost chuck key can delay the finishing of household projects.

The best known prior art means for storing a chuck key was to tape or wire the chuck key to an electric cord supplying the drilling machine with power. However, this means is inadequate for a number of reasons. One drawback is that when using the chuck key to loosen or tighten a chuck, the electric cord is twisted, thus, damaging the electric cord. Furthermore, the chuck key attached to the electric cord is remote to the drilling machine and therefore inconveniently located with respect to the operator of the drilling machine. Still further, the chuck key attached to the electric cord easily gets caught on obstacles at a job site as a portable drilling machine is moved from work station to work station.

Therefore, a need exists for an inexpensive, convenient and simple storage apparatus for storing a chuck key on a drilling machine.

SUMMARY OF THE INVENTION

The present invention is a chuck key storage apparatus for use with a drilling machine which apparatus is adapted to be attached to the drilling machine. The apparatus includes a retractor adapted to be connected to the drilling machine. The retractor is movable between a stored position and a functional position. A chuck key is adapted to be attached to the retractor for movement therewith between the stored and functional positions such that, when in the stored position the chuck key is remote from a chuck of the drilling machine and when in the functional position it is located to operatively engage the chuck to loosen or tighten the chuck.

DESCRIPTION OF THE DRAWINGS

A better understanding of the present invention will be had upon reference to the accompanying drawings in which like numerals refer to like parts in the several views and in which.

DESCRIPTION OF THE PREFERRED EMBODIMENT

Figure 1:
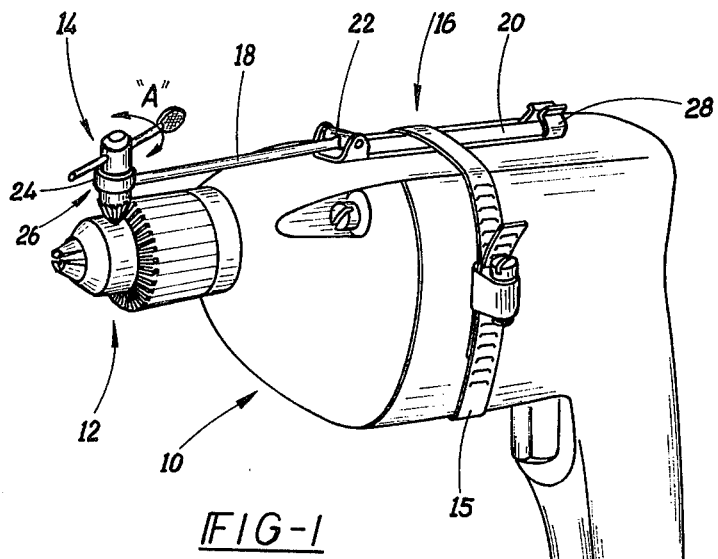
FIG. 1 is a perspective view of a drilling machine having a preferred embodiment of a chuck key storage apparatus attached thereto.

With reference to FIG. 1, there is shown a drilling machine 10 including a chuck 12 for holding a drill (not shown). A chuck key 14 is adapted to engage the chuck 12 in a well known manner, to allow an operator of the machine to selectively loosen the chuck to remove the drill from and tighten the chuck to retain the drill therein. A chuck key storage apparatus, generally denoted as 16, is shown removable attached to the drilling machine 10 by, for example, an adjustable clamp 15.

Figure 3:
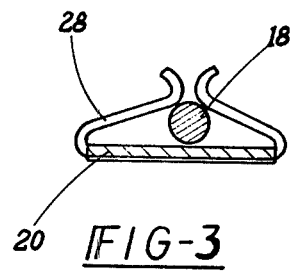
FIG. 3 is a view of the storage device taken along line 3—3 of FIG. 2.
Figure 2:
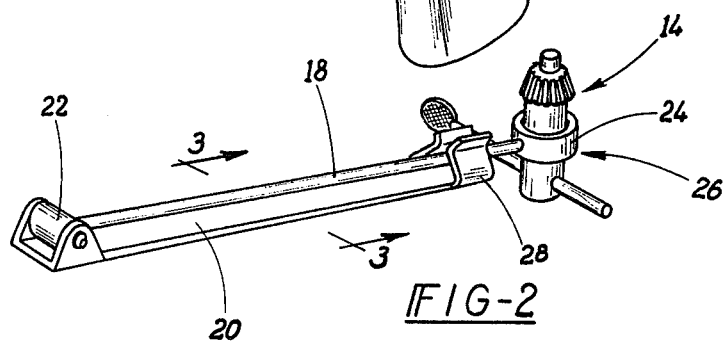
FIG. 2 is a perspective view of the storage apparatus shown in FIG. 1 detached from the drilling machine.

Referring now to FIGS. 1, 2, and 3, the chuck key storage apparatus 16 comprises a retractor means, such as an elongated arm 18, and a mounting plate 20. The arm 18 is pivotally connected at one of its ends 22 to the mounting plate 20 and has a bearing 24 at its free end 26. The bearing 24 is adapted to receive and retain the chuck key 14 while allowing the key 14 to rotate about the axis of the bearing 24, as indicated by the arrow "A" in FIG. 1. A retaining means, such as a resilient clip 28, is connected to the plate 20.

With reference to FIG. 1, the apparatus 10 is shown in the functional position wherein the arm 18 is pivoted about its end 22 away from the plate 20 such that its free end 26 is located next to the chuck 12 so that the chuck key 14 can easily engage the chuck for loosening or tightening the chuck by rotating the key 14 in the bearing 24 in the direction of arrow "A."

With reference to FIGS. 2 and 3, the apparatus 16 is shown in the stored position wherein the arm 18 is pivoted about its end 22 to overlie the plate 20 such that the free end 26, and, thus, the key 14, is remotely disposed to the chuck 12. The arm 18 is received in the clip 28 and is thereby retained in the stored position.

It is contemplated that the apparatus 16 may be a separate component of a drilling machine or be an integral part of the drilling machine. In the case wherein the apparatus 16 is an integral component of the drilling machine 10, the mounting plate 20 would be eliminated and the arm 18 would be pivotally mounted directly to the machine 10.

The apparatus 16 can be fabricated of virtually any material. For example, the arm 18 and mounting plate can be fabricated of a single continuous strip of flexible plastic material, such as polypropylene, transversely scored between its ends to form the hinge 22.

Figure 4:
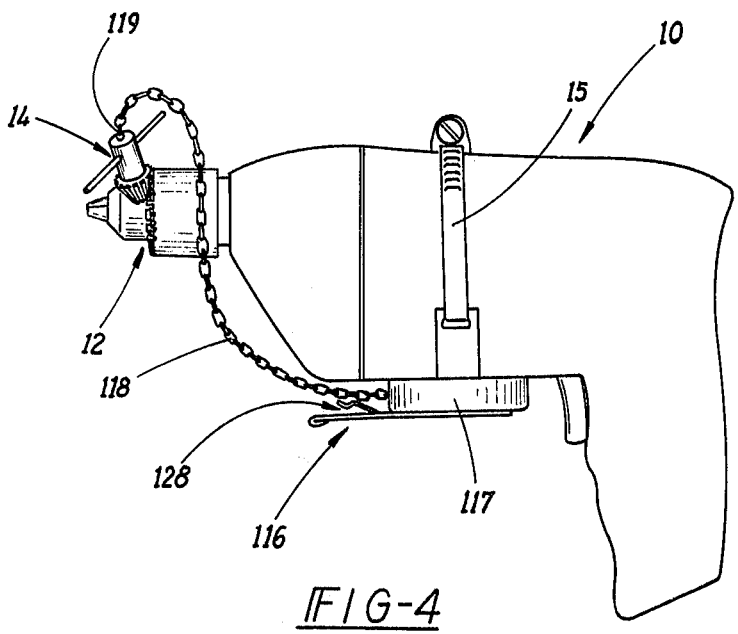
FIG. 4 is a side view of a drilling machine having another preferred embodiment of a chuck key storage apparatus attached thereto; and, FIG. 5 is a perspective view of the chuck key storage device shown in FIG. 4 detached from the drilling machine.
Figure 5:
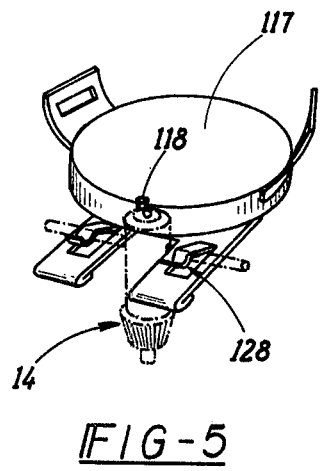

Turning now to FIGS. 4 and 5, there is shown a chuck key storage apparatus 116 again removably attached to the drilling machine 10 by the adjustable clamp 15. The apparatus 116 comprises a reel 117 biased by, for example, a spring (not shown), to rotate about its axis in one direction. A teather 118 is connected at one of its ends to the reel 117 and the chuck key 14 is connected to the free end 119 of the teather 118. The reel 117 is biased in a direction to wind the teather 118 upon it so as to move the chuck key 14 from the functional position (illustrated in FIG. 4) wherein, it is disposed to engage the chuck 12 to a stored position (illustrated in FIG. 5) remote to the chuck 12. The apparatus 116 further comprises a retainer means, such as a resilient clip 128 connected to the reel 117. The clip 128 is adapted to engage the chuck key 14 to retain it in the stored position.

The foregoing detailed descriptions are given primarily for clearness of understanding and no unnecessary limitations should be understood therefrom, for modifications will be obvious to those skilled in the art upon reading this disclosure and may be made without departing from the spirit of the invention or the scope of the appended claims.

What is claimed is:

1. A chuck key storage apparatus adapted for use with a motor driven drilling machine, said chuck key storage apparatus comprising:

a mounting plate adapted to be removably attached to the drilling machine motor housing with one axis of said plate beind disposed generally parallel to the axis of rotation of the drill chuck;

an elongated arm pivotally mounted at one of its ends to said mounting plate with the pivotal axis being generally perpendicular to the axis of rotation of the drill chuck, for pivotal movement through an arc of approximately 180° between a stored position and a functional position;

a chuck key mounting bearing connected to the opposite free end of said elongated arm and adapted to receive a chuck key for rotational movement about an axis disposed at a right angle to the pivotal axis of said elongated arm;

a resilient clip which releasably engages said elongated arm between the ends of said arm to selectively retain said arm in the stored position 180° from the functional position, said resilient clip being connected to said elongated mounting plate.

* * * * *